(12) United States Patent
Patel et al.

(10) Patent No.: US 10,108,239 B2
(45) Date of Patent: Oct. 23, 2018

(54) COMPUTING DEVICES OPERABLE ON RECOVERED WASTE HEAT

(71) Applicant: Hewlett Packard Enterprise Development LP, Houston, TX (US)

(72) Inventors: Chandrakant Patel, Fremont, CA (US); Jichuan Chang, Sunnyvale, CA (US); Cullen E. Bash, Los Gatos, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 61 days.

(21) Appl. No.: 15/113,995

(22) PCT Filed: Jan. 31, 2014

(86) PCT No.: PCT/US2014/014258
§ 371 (c)(1),
(2) Date: Jul. 25, 2016

(87) PCT Pub. No.: WO2015/116198
PCT Pub. Date: Aug. 6, 2015

(65) Prior Publication Data
US 2016/0349816 A1 Dec. 1, 2016

(51) Int. Cl.
*G06F 1/30* (2006.01)
*G06F 1/28* (2006.01)
(Continued)

(52) U.S. Cl.
CPC ................ *G06F 1/28* (2013.01); *G06F 1/26* (2013.01); *G06F 1/30* (2013.01); *G06F 1/3206* (2013.01); *G06F 11/00* (2013.01)

(58) Field of Classification Search
CPC .............................. G06F 1/30; G06F 11/1456
See application file for complete search history.

(56) References Cited

U.S. PATENT DOCUMENTS 5,419,780 A 5/1995 Suski
6,307,142 B1 10/2001 Allen et al.
(Continued)

FOREIGN PATENT DOCUMENTS

JP 2011192756 9/2011
JP 2012234708 11/2012
(Continued)

OTHER PUBLICATIONS

International Searching Authority, The International Search Report and the Written Opinion, Sep. 24, 2015, 10 Pages.
(Continued)

*Primary Examiner* — Albert Wang
(74) *Attorney, Agent, or Firm* — Brooks, Cameron & Huebsch, PLLC

(57) ABSTRACT

Systems and methods for operating based on recovered waste heat are described. In one example, the method includes receiving recovered waste heat power and operating at least one system component of a recovered waste heat based computing device based on the recovered waste heat power, where the at least one system component is coupled to a non-volatile memory of the recovered waste heat based computing device. The method further includes preserving operational states of the at least one system component in the non-volatile memory based on a current power level associated with the recovered waste heat power.

20 Claims, 7 Drawing Sheets

(51) Int. Cl.
*G06F 1/26* (2006.01)
*G06F 11/00* (2006.01)
*G06F 1/32* (2006.01)

(56) References Cited

U.S. PATENT DOCUMENTS

| | | | |
|---|---|---|---|
| 2004/0250147 A1* | 12/2004 | Chang | G06F 1/3203 |
| | | | 713/323 |
| 2005/0074646 A1 | 4/2005 | Rajashekara et al. | |
| 2008/0209237 A1* | 8/2008 | Kim | G06F 1/263 |
| | | | 713/300 |
| 2011/0303258 A1 | 12/2011 | Kahn | |
| 2014/0001762 A1 | 1/2014 | Temelci-Andon et al. | |
| 2014/0183947 A1* | 7/2014 | Chandler | H02J 9/061 |
| | | | 307/23 |

FOREIGN PATENT DOCUMENTS

| KR | 20010068354 | 7/2001 |
|---|---|---|
| KR | 20120036113 | 4/2012 |
| KR | 1020130074988 | 7/2013 |

OTHER PUBLICATIONS

Thepmanee, T. et al., Waste-heat Thermoelectric Power Source for Industrial Wireless Transmitters, (Research Paper), May 19-21, 2010, 1 Pg.

* cited by examiner

COMPUTING DEVICES OPERABLE ON RECOVERED WASTE HEAT

BACKGROUND

Many physical systems, such as manufacturing systems and power systems deployed in power plants and factories produce enormous amounts of wasted heat. For example, industrial processes in glass factories and cement factories generate large amounts of waste heat as a by-product. Sources of waste heat include space heating assemblies, steam boilers, freezer condenser, engines, baking ovens, pipes, and cooling systems. For instance, pipes in factories carry a waste stream of exhaust gases at a given temperature.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the figures to reference like features and components:

FIG. 2b illustrates a network environment implementation of the waste heat based computing system of FIG. 2a;

DETAILED DESCRIPTION

Figure 1:
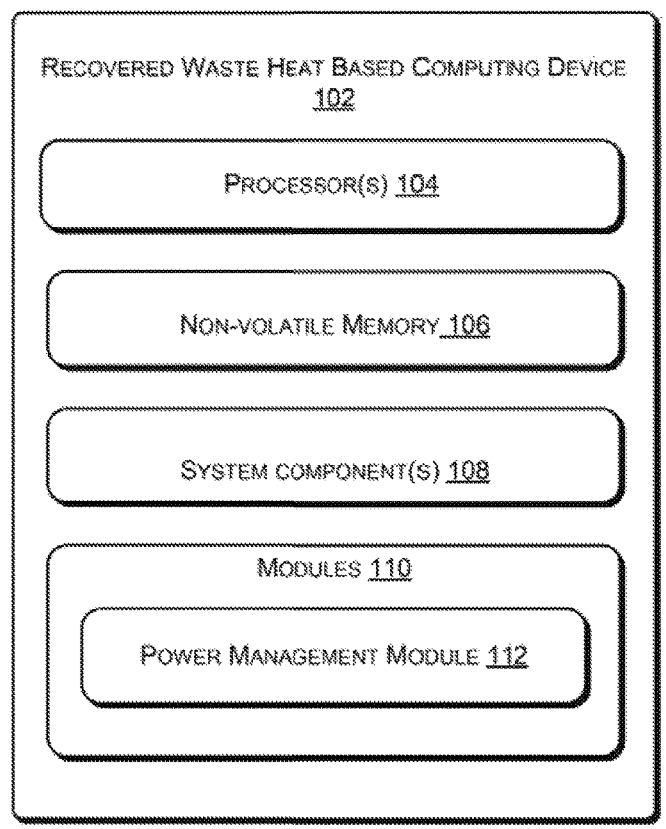
FIG. 1 illustrates an example recovered waste heat based computing device.

Heat energy is one of the most wasted forms of energy sources. Waste heat is produced everyday and almost everywhere from diverse sources. For example, enormous amounts of waste heat are produced by physical systems, such as manufacturing systems and power systems deployed in power plants, manufacturing units, and factories. Generally, one-fourth to one-half of industrial energy is lost as waste heat in the form of hot exhaust gases, cooling water, and heat lost from hot equipment surfaces and from heated products. This waste heat is dumped into the environment everyday.

Also, energy consumption by factories and manufacturing plants is increasing exponentially every day. Energy is consumed by the physical systems for a wide range of purposes including assembly, producing steam, cogeneration, heating, and air conditioning. Therefore, because of an increase in energy consumption, rising energy prices are a major concern for many manufacturing plants and factories. Moreover, the increase in energy consumption has led to overexploitation of energy resources. For instance, fossil fuels are burned to produce electricity for a vast number of industrial processes and are, accordingly, being rapidly depleted. Further, as a result of burning, there may be emission of harmful gases, such as carbon dioxide ($CO_2$) and carbon monoxide (CO) into the environment and higher levels of carbon emissions may lead to green house effect and other environmental damages. Therefore, energy consumption by factories, power plants, and other manufacturing units is resource intensive, includes high costs, and causes severe damages to the environment.

Many physical systems, such as those in factories have high temperature waste heat streams. For example, pipes in factories may carry a waste stream of exhaust gases at a very high temperature. Given the high temperature of the waste heat, there is significant energy available in the waste heat that can still be utilized instead of just dumping the waste heat into the environment.

In order to meet the increasing energy demand, the waste heat can be recovered and energy available in the waste heat can be transformed into usable energy. The recovered waste heat can be used for various purposes. One such purpose can be to generate power from the recovered waste heat. However, the recovered waste heat is generally not used for computing. The reason being, computing systems are typically designed to operate on a consistent non-fluctuating stable source of power while power generated from the recovered waste heat may not be stable. Therefore, operating computing systems on the recovered waste heat poses various technical difficulties. In one example, an unstable source of power may lead to loss of data of the computing systems. For instance, data of a computing system may get lost if there is a power failure or fluctuation.

Systems and methods for operating on recovered waste heat power are disclosed herein. The present subject matter provides a waste heat based computing system for recovering waste heat and operating based on the recovered waste heat.

In an example implementation, the waste heat based computing system employs a waste heat recovery device and a recovered waste heat based computing device coupled to the waste heat recovery device. As generally described herein, the term "coupled" refers to two entities that exchange data signals with one another, such as, for example, electrical, electromagnetic, and optical signals, among others. The coupling may be a direct connection or over a network. The recovered waste heat based computing device includes waste heat powered components operable on the power generated by the waste heat recovery device. In an example, the waste heat powered components may include system components, a processor, and a non-volatile memory.

The waste heat recovery device receives waste heat from a waste heat source and converts the waste heat into power. The waste heat recovery device then supplies the power to the recovered waste heat based computing device for its operation. When the power diminishes or is not available at all, the recovered waste heat based computing device preserves operational states of the system components in the non-volatile memory. The operational states preserved in the non volatile memory can also be restored once the power becomes available.

Factories and power plants with sources of waste heat can use the waste heat based computing system described herein. Since the waste heat based computing system is powered by recovered waste heat power, additional power may not be used. Further, although the power generated from the waste heat may not be stable, the waste heat based computing system preserves the operational states of the system components in the non-volatile memory. Therefore, data of the system components is not lost even if there is a power outage. Further, the operational states of the system components may be restored once the power is available.

Moreover, the waste heat based computing system described herein can be used in handling work loads that may not be very time critical. For example, if a factory has a database that has to be synced with databases of other branches of the factory, then the process of synchronization can be done in an on and off manner, i.e., based on the availability of the waste heat. Therefore, the waste heat based computing system provides an effective way to increase energy efficiency by operating based on the recovered waste heat. As a result, factories, power plants, and other manufacturing units can make huge savings. Also, consumption of resources can be significantly reduced, thereby minimizing the impact on the environment.

The manner in which the waste heat based computing system operates based on the waste heat is described henceforth. Further, for the sake of clarity, the manner in which the waste heat based computing system operates based on the waste heat is described in three stages. The three stages being waste heat recovery stage, power generation stage, and operating stage.

In an example implementation, in the waste heat recovery stage, the waste heat recovery device of the waste heat based computing system receives waste heat from a waste heat source. Examples of the waste heat source include an annealing furnace, an air compressor, a pump, a pipe, and an air conditioning, and refrigeration condenser. In an example, the waste heat recovery device and the waste heat source may be deployed in a deployment site, such as a factory or a manufacturing plant.

The description hereinafter is explained with reference to a single waste heat source for the purpose of description herein. In an example implementation, the waste heat recovery device may receive the waste heat from multiple waste heat sources.

According to an example, in the power generation stage, the waste heat recovery device generates power from the waste heat. Efficiency of the power generation is dependent on the temperature of the waste heat. In general, medium to high temperature waste heat can be used for the power generation. There may be instances where the temperature of the waste heat received from the waste heat source may not be enough for power generation. In such cases, the waste heat recovery device may receive the waste heat from multiple waste heat sources to increase the temperature for efficiently generating the power from the waste heat.

Subsequently, the waste heat recovery device may supply the power to the recovered waste heat based computing device. As mentioned previously, the recovered waste heat based computing device comprises waste heat powered components, such as the non-volatile memory, the processor, and at least one system component. In one example, the non-volatile memory may include read only memory (ROM), phase change memory (PCM), Memristor, spin-transfer torque random access memory (STT-RAM), Electro-mechanical diode, erasable programmable ROM, flash memories, and hard disk drives, and examples of the system components include a motherboard, a fan, a Peripheral Component Interconnect (PCI) sound card, a graphics card, and the like.

In an example implementation, in the operating stage, it is determined whether the power is above a pre-determined usable threshold. The usable threshold may be based on a power requirement of the recovered waste heat based computing device. For example, the usable threshold may be based on the overall power requirement of the waste heat powered components. In an example, if the recovered waste heat based computing device comprises of a single system component, a processor, and a non-volatile memory, then the usable threshold may be determined based on a power rating of each of the system component, the processor, and the non-volatile memory.

Upon determining that the power is above the usable threshold, the recovered waste heat based computing device initializes the waste heat powered components and supplies the power to the waste heat powered components based on an operation parameter corresponding to each of the waste heat powered components. The operation parameter may be one of a performance target and a power rating. In an example, the power rating of a waste heat powered component may be based on a current rating and a voltage rating of the waste heat powered component. Further, the performance target of a waste heat powered component may be understood as a power level at which the waste heat powered component performs optimally.

Thereafter, the recovered waste heat based computing device may monitor a functional state of the waste heat source to determine a current power level. The current power level may be understood as a power level of the waste heat which the waste heat recovery device receives from the waste heat source. In one example, the current power level may be determined by determining a rate of change in temperature of the waste heat source.

The recovered waste heat based computing device further monitors the waste heat source to detect whether the current power level is below a predetermined operable threshold. The operable threshold may be understood as a minimum power at which the system component operates. Based on the determination, the recovered waste heat based computing device may initiate a power retrench mode. The power retrench mode may relate to preserving operational states of the system component in the non-volatile memory.

In one example, the recovered waste heat based computing device may initiate the power retrench mode based on enabling one of a hibernate mode, a hybrid sleep mode, and a switch OFF mode. In another example, the recovered waste heat based computing device may initiate the power retrench mode based on throttling operations of the waste heat powered components, such as the system component and the processor. The throttling of an operation of a waste heat powered component may be based on a trade off between performance and the power requirement of the waste heat powered component. Further, the recovered waste heat based computing device may restore the preserved operational states of the system component once the power is available.

Although pipes and turbines in factories have been described as sources of waste heat in several example implementations in the present description, the concept explained in context of such waste heat sources may be extended to any other waste heat source. In an example, an aircraft jet engine may also be a waste heat source. The jet engine generally operates at a significantly high temperature. Also, the temperature difference between the source of waste heat in the aircraft jet engine, for example, an exhaust pipe carrying hot gases, and the ambient atmosphere may be significantly high. In an example implementation, recovered waste heat from such exhaust pipe of the aircraft jet engine may be used to operate the recovered waste heat based computing device.

Since, in an event of power outage, the waste heat based computing system preserves the operational states of the system components in the non-volatile memory, the use of the non-volatile memory makes it possible to make waste heat based computing systems operate on the waste heat which is typically inconsistent in nature. Further, since by switching to this energy-efficient method consumption of resources, such as fossil fuels, is reduced, the emission of harmful gases, for example, $CO_2$ and CO, is also reduced. Hence, the waste heat based computing device operating based on recovered waste heat is efficient in terms of cost and resources while having a minimum impact on the environment.

The above systems and the methods are further described in conjunction with the following figures. It should be noted that the description and figures merely illustrate the principles of the present subject matter. Further, various arrangements may be devised that, although not explicitly described or shown herein, embody the principles of the present subject matter and are included within its spirit and scope.

The manner in which the systems and methods operate based on recovered waste heat are explained in detail with respect to FIGS. 1 to 5b. While aspects of described systems and methods for operating based on recovered waste heat can be implemented in any number of different computing systems, environments, and/or implementations, the examples and implementations are described in the context of the following system(s).

FIG. 1 illustrates an example recovered waste heat based computing device 102. The recovered waste heat based computing device 102, hereinafter referred to as the computing device 102, is powered based on power generated from waste heat. In an example, the competing device 102 is powered entirely on the recovered waste heat power. In another example, the computing device 102 is powered partially on the recovered waste heat power.

In an example, the computing device 102 may be any communication or computing device, such as a laptop computer, a desktop computer, a workstation or server. In another example, the computing device 102 may be any measurement device built with a non volatile memory for analyzing data and processing the data for performing an action.

According to an example, the computing device 102 may be a palm size form factor computing device, for example, a smartphone, a tablet, and the like built with a system on a chip (SoC). In an example implementation, the computing device 102 includes processor(s) 104 and a non-volatile memory 106 coupled to the processor(s) 104.

The processor(s) 104 may be implemented as one or more microprocessors, microcomputers, microcontrollers, digital signal processors, central processing units, state machines, logic circuitries, and/or any devices that manipulate signals based on operational instructions. Among other capabilities, the processor(s) 104 may be configured to fetch and execute computer-readable instructions stored in the non-volatile memory 106. The non-volatile memory 106 may include any non-volatile computer-readable medium known in the art, for example, read only memory (ROM), phase change memory (PCM), Memristor, spin-transfer torque random access memory (STT-RAM), electro-mechanical diode, erasable programmable ROM, flash memories, and hard disk drives. The non-volatile memory 106 is capable of retaining stored data even after a power failure.

In an example, the computing device 102 further includes system component(s) 108, coupled to the processor 104, and module(s) 110. The system component(s) 108 of the computing device 102 may include a motherboard, a fan, a Peripheral Component Interconnect (PCI) sound card, a graphics card, and the like.

The module(s) 110 include, for example, a power management module 112. In an example, the computing device 102 may also include a power storage medium (not shown), such as a battery. Although, it is shown that the power management module 112 is integrated within the computing device 102, the power management module 112 can be external to the computing device 102.

The power management module 112, amongst other things, may include routines, programs, objects, components, and data structures, which perform particular tasks or implement particular abstract data types. The power management module 112 may also be implemented as, signal processor(s), state machine(s), logic circuitries, and/or any other device or component that manipulates signals based on operational instructions. Further, the power management module 112 can be implemented by hardware, by computer-readable instructions executed by a processing unit, or by a combination thereof.

Further, the computing device 102 may also be coupled to a waste heat recovery device and the waste heat recovery device may be coupled to a waste heat source (not shown in FIG. 1). In an example, the computing device 102, the waste heat recovery device, and the waste heat source may be deployed in a deployment site in close proximity to one another. The deployment site may be a factory, a manufacturing unit, a power plant, and the like.

According to an example, the waste heat recovery device may recover waste heat from the waste heat source. Examples of the waste heat source include an annealing furnace, an air compressor, a pump, a pipe, and an air conditioning and refrigeration condenser. For example, pipes in factories may carry a waste stream of exhaust gases at a giver temperature. Upon recovering the waste heat from the waste heat source, the waste heat recovery device may generate power from the waste heat. Subsequent to generation of the power, the waste heat recovery device may provide the power to the power management module 112 of the computing device 102. In an example, the waste heat recovery device may provide the power to the power management module 112 based on availability of the waste heat, i.e., whether it is continuous, cyclic, or intermittent. The availability of the waste heat may be based on an industrial process at the deployment site.

In an example, the power management module 112, upon receiving the power, may determine whether the power is above a pre-determined usable threshold. In another example, the waste heat recovery device may determine whether the power is above the usable threshold. The usable threshold may be based on a power requirement of the computing device 102. For instance, the usable threshold may depend on a power requirement of the processor 104, the non-volatile memory 106, and the system components 108. The power requirement of the system components 108 may be understood as an overall power rating at which the processor 104, the non-volatile memory 106, and the system components 108 operate. In an example, the usable threshold may be determined by a user. The user may be a design engineer who may be managing the computing device 102 deployed in the deployment site.

According to an example, if the computing device 102 includes one system component 108 with a power rating of 20 watts, the processor 104 with a power rating of 80 watts and the non-volatile memory 106 with a power rating of 5 watts, then the usable threshold is 105 watts. In another example, if the computing device 102 includes four system components 108 with power ratings of 20 watts, 10 watts, 50 watts, and 18 watts, respectively, the processor 104 with a power rating of 80 watts and the non-volatile memory 106 with a power rating of 5 watts, then the usable threshold is 183 watts (20 watts+10 watts+50 watts+18 watts+80 watts+5 watts).

In case the power received by the power management module 112 is below the usable threshold, the power management module 112 stores the power into the power storage medium of the computing device 102 until the power is above the usable threshold. In case the power received is above the usable threshold, the power management module 112 may initialize the at least one system component 108, the processor 104, and the non volatile memory 106 to supply the recovered waste heat power. In an example, the power management module 112 may supply the power to the system component 108, the processor 104, and the non-volatile memory 106 based on a respective operation parameter of the system component 108, the processor 104, and the non-volatile memory 106. The operation parameter may include one of a power rating and a performance target. A power rating of each of a system component 108, a processor 104, and a non-volatile memory 106 may be understood as a power level at which the system component 108, the processor 104, and the non-volatile memory 106 operates. In an example, the power rating may be based on a current rating and a voltage rating. Further, a performance target of each of the system component 108, the processor 104, and the non-volatile memory 106 may be understood as a power level at which the system component 108, the processor 104, and the non-volatile memory 106 performs optimally.

In an example, if the power received by the power management module 112 is 150 watts and the performance target of one system component 108 is 60 watts and performance target of other system component 108 is 50 watts, then the power management module 112 supplies 80 watts of power to the first system component 108 and 50 watts to the second system component 108. In an example, the power management module 112 may store the additional 40 watts of power (150–110 watts) in the power storage medium for future use.

Thereafter, the power management module 112 may monitor the waste heat source to determine a current power level. The current power level may be understood as a power level of the waste heat which the waste heat recovery device may be receiving from the waste heat source. The current power level may be one of high, medium, and low. Since waste heat does not drop instantly, the power management module 112 can detect when the waste heat potentially stops by determining a rate of change in temperature of the waste heat source. The power management module 112 can also use the remaining power to preserve operational states of the system component 108. In an example, temperature sensors may be placed on the waste heat source for monitoring the rate of change in its temperature. The rate of change in temperature may be small, medium, or large. According to an example, if the rate of change in temperature of the waste heat source is large, then the current power level may be high. In case the rate of change in temperature is medium, the current power level may be medium and in case the rate of change is small, then the current power level may be low.

In an example implementation, the power management module 112 may determine the current power level based on availability of the waste heat. The availability of the waste heat can be identified based on whether the waste heat is continuously produced, cyclically produced, intermittently produced, or is not produced at all. The continuously produced waste heat may be understood as waste heat which is produced without any interruption. The cyclically produced waste heat may be understood as waste heat which is recurring in regular intervals and the intermittently produced waste heat may be understood as the waste heat which is produced non-continuously at irregular intervals.

In an example, if the availability of the waste heat is continuous, the current power level may be high. In another example, if the availability of the waste heat is cyclic or intermittent, then the average current power level may be medium. In yet another example, if the waste heat is not produced at all, then the current power level may be low. Although it has been described that the current power level may be one of high, medium, and low, the current power level may be a measure of the power in watts.

According to an example, the power management module 112 may further determine whether the current power level is below a predetermined operable threshold. The operable threshold may be understood as a minimum power at which the system component 108 operates. In case the recovered waste heat based component device 102 includes more than one system component 108, the operable threshold may depend on the power requirement of all the system components 108. In one example, the operable threshold may be same as the usable threshold.

In an example, the power management module 112 may monitor the waste heat source at a plurality of pre-defined time intervals to determine whether the current power level is below the operable threshold. In an example, the time intervals and the operable threshold may be defined by the user, say a design engineer.

The power management module 112 monitors the waste heat source to detect whether the current power level is below the operable threshold. If the current power level is above the operable threshold, the power management module 112 continues to monitor the waste heat source and takes no action. In case the current power level is below the operable threshold, the power management module 112 may determine a backup power level. The backup power level may be understood as a power level which is available as a secondary source. In an example, the power management module 112 may determine the backup power level based on power stored or available in the power storage medium.

Thereafter, based on the current power level and the backup power level, the power management module 112 may initiate a power retrench mode. The power retrench mode may relate to preserving operational states of the system component 108 in the non-volatile memory 106. In one example, the power management module 112 may initiate the power retrench mode based on enabling one of a hibernate mode, a hybrid sleep mode, and a switch OFF mode. The hibernate mode may be understood as a power saving mode in which the operational states of the system component 108 are stored in the non-volatile memory 106 and then the computing device 102 is shut down. For example, the hibernate mode may use substantially zero power.

The hybrid sleep mode is a combination of sleep mode and the hibernate mode. In the hybrid sleep mode, the operational states are stored in the non-volatile memory 106 and the computing device 102 is put into a low-power state, i.e., in a stand by state or in a sleep state. The hybrid sleep mode uses very little power. In the switch OFF mode, the operational states are stored in the non-volatile memory 106 and the computing device 102 is completely off, and consumes no power. The computing device 102 returns to a working state after a full reboot.

In an example, the power retrench mode may be initiated by the user who may be managing the computing device 102. Further, in one scenario, if the current power level is high and the backup power level is zero or the current power level is low and the backup power level is high, then the power management module 112 may initiate the hybrid-sleep mode. In another scenario, if the current power level is approaching zero and the backup power level is zero, then the power management module 112 may initiate the hibernate mode or the switch OFF mode.

In another example, the power management module 112 may initiate the power retrench mode based on throttling operations of the system components 108 and the processor 104. The throttling of the operations may be based on a trade off between performance and power requirement. In an example, if the current power level is medium and the backup power level is zero, then the processor 104 may be shut down.

Further, the power management module 112 may restore the preserved operational states of the system components 108 based on initializing the system component 108 for operation. The power management module 112 may restore the operational states once power is available. In an example, the source of the power may be waste heat.

According to an example implementation, the power management module 112 may initialize the system components 108 based on bringing the computing device 102 into a working state. Further, in case the user does not want to reboot the computing device 102, the user may initiate the hibernate mode and not the switch OFF mode if the current power level is approaching zero and the backup power level is zero. Therefore, the operational states of the system components 108 are preserved even when the power is not available.

Figure 2A:
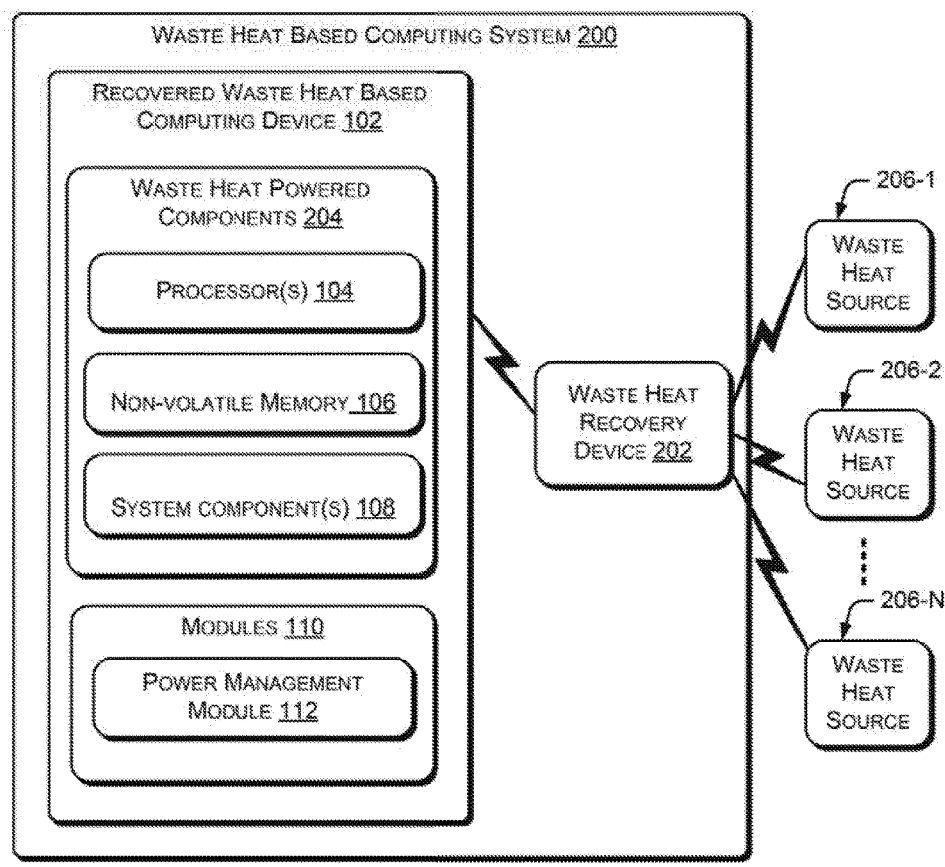
FIG. 2a illustrates an example waste heat based computing system.

FIG. 2a illustrates an example waste heat based computing system 200. In an example, the waste heat based computing system 200 may be any communication or computing device, such as a laptop computer, a desktop computer, a workstation, a server or a palm size form factor computing device, for example, a smartphone, a tablet and the like). In one example, the waste heat based computing system 200 may be deployed in a deployment site, such as a factory, a manufacturing unit a power plant, and the like.

The waste heat based computing system 200 comprises a recovered waste heat based computing device 102 coupled to a waste heat recovery device 202. In an example, the recovered waste heat based computing device 102, hereinafter referred to as the computing device 102, includes waste heat powered components 204 operable on the power generated by waste heat. As shown in FIG. 2a, the waste heat powered components 204 include processor 104, the non-volatile memory 106 coupled to the processor(s) 104, and at least one system component 108.

Further, the computing device 102 includes the power management module 112. The computing device 102 may also include a power storage medium (not shown in FIG. 2a). In an example, the power storage medium may be a battery. Further, although, one waste heat recovery device 202 has been depicted in the FIG. 2, there may be more than one waste heat recovery device 202 coupled to the computing device 102.

According to an example, the waste heat recovery device 202 is coupled to a plurality of waste heat sources 206-1, 206-2, . . . , 206-N, collectively referred to as waste heat sources 206 and individually referred to as a waste heat source 206. The waste heat source 206 may include, but is not limited to, an annealing furnace, an air compressor, a pump, a pipe, a high power server, and an air conditioning and refrigeration condenser. In said example, the waste heat based computing system 200 may be deployed in cose proximity to the waste heat sources 206.

In an example, the waste heat recovery device 202 may recover waste heat from at least one waste heat source 206. Upon recovering the waste heat from the waste heat source 206, the waste heat recovery device 202 may generate power from the waste heat. In one example, efficiency of power generation is dependent on the temperature of the waste heat. In general, medium to high temperature waste heat can be used for power generation. In an example, pipes in factories may carry a waste stream of exhaust gases at a high temperature.

Referring to the above example, there is a significant energy available in the waste stream that can be utilized for generation of power. In an example, the waste heat recovery device 202 may determine the usable energy using equation (1) provided below:

$$A = \left(1 - \frac{T_a}{T_j}\right)Q \qquad (1)$$

where A represents the usable energy (in joules) which can be recovered from the waste heat.

Q represents the total waste heat energy (in joules).

$T_a$ represents a sink temperature to which the waste heat is being transferred, and $T_j$ represents a temperature (in Kelvin) of the waste neat source 206.

In an example, if the temperature of the waste heat source 206 is 298 K and the waste heat source 206 produces 1 joule of total waste heat energy at 773 K, then 0.614 joules of usable energy can be recovered from the waste heat source 206. Therefore, the waste stream of 773 K temperature has 61% usable energy which can be harvested for generation of power. The usable energy may depend on efficiency of the waste heat recovery device 202 and irreversible losses, such as friction. In another example, if the temperature of the waste heat, such as of exhaust air from a high power server, is 323 K, then 0.077 joules of usable energy can be recovered from the waste heat source 206.

Upon receiving the waste heat from the waste heat source 206. the waste heat recovery device 202 may generate power torn the waste heat. In an example, the waste heat recovery device 202 may be exposed to a thermal gradient via the Peltier effect for generation of power. According to said example, the waste heat recovery device 202 may be a Peltier module, such that the waste heat recovery device 202 interfaces on one side to the waste heat source 206 at temperature $T_j$ and transfers heat to a heat sink at temperature $T_a$. The difference in temperature results in generation of voltage and current, which are used for computing. Subsequent to generation of the power, the waste heat recovery device 202 may provide the power to the power management module 112 of the computing device 102.

According to an example, the power management module 112, upon receiving the power, may determine whether the power is above the pre-determined usable threshold. In another example, the waste heat recovery device 202 may determine whether the power is above the usable threshold. In case the received power is below the usable threshold, the power management module 112 stores the power into the power storage medium until the power is above the usable threshold and in case the power received is above the usable threshold, the power management module 112 may initialize the waste heat powered components 204 to supply the power to the waste heat powered components 204.

In an example, the power management module 112 may supply the power to at least one system component 108, the processor 104, and the non-volatile memory 106 based on at least one operation parameter corresponding to each of the system component 108, the processor 104, and the non-volatile memory 106. The operation parameters for a waste heat powered component 204 may include a performance target of the waste heat powered components 204 and a power rating at which the waste heat powered components 204 operates.

For instance, if the power received by the power management module 112 is 150 watts and the power rating of a system component 108 is 20 watts, the power rating of the processor 104 is 90 watts and the power rating of the non-volatile memory 106 is 10 watts, then the power management module 112 supplies 20 watts of power to the system component 108, 90 watts of power to the processor 104, and 10 watts of power to the non-volatile memory 106. In an example implementation, the power management module 112 may store the additional 30 watts of power (150–120 watts) in the power storage medium for future use.

Subsequently, the power management module 112 may monitor a functional state of the at least one waste heat source 206 to determine the current power level. The current power level may be understood as a power level of the waste heat which the waste heat recovery device 202 may be receiving from the waste heat source 206. The current power level may be one of high, medium, end low. In an example, the functional state of the waste heat source 206 may be determined based on availability of the waste heat. For example, if the waste heat is continuously produced, then the functional state of the waste heat source 206 may be "Fully functional". In another example, if the waste heat is cyclically or intermittently produced, then the functional state of the waste heat source 206 may be "Partially functional". In yet another example, if waste heat is net produced at all, then the functional stele of the waste heat source 206 may be "Non functional".

In another example, the functional state of the waste heat source 206 may be determined based on determining a rate of change in temperature of the waste heat source 206. The rate of change in temperature of the waste heat source 206 may be one of small, medium, and large.

As mentioned above, the power management module 112 may monitor the functional state of the waste heat source 206 to determine the current power level. Therefore, if the functional state of the waste heat source 206 is "Fully functional", then the current power level may be high. Similarly, if the functional state of the waste heat source 206 is "Partially functional", then the current power level may be medium, and if the functional state of the waste heat source 206 is "Non functional", then the current power level may be low.

As described in FIG. 1, the power management module 112 may further determine whether the current power level is below the pre-determined operable threshold. In one case, if the current power level is above the operable threshold, the power management module 112 continues to monitor the waste heat source 206 and takes no action. In another case, if the current power level is below the operable threshold, the power management module 112 may determine the backup power level.

Thereafter, based on the current power level and the backup power level, the power management module 112 may initiate the power retrench mode through enabling one of the hibernate mode, the hybrid sleep mode, and the switch OFF mode. The power retrench node may relate to preserving operational states of the system component 108 in the non-volatile memory 106.

Further, the power management module 112 may restore the preserved operational states of the system components 108 based on initializing the system component 108 for operation. The power management module 112 may restore the operational states once power is available. In an example, the power management module 112 may initialize the system components 108 based on bringing the computing device 102 into a working state.

Although it is depicted in the FIG. 2a that the computing device 102, the waste heat recovery device 202, and the waste heat sources 206 are deployed in close proximity to one another, any one or both of the computing device 102 and the waste heat recovery device 202 may be mounted on the waste heat source 206.

Figure 2B:
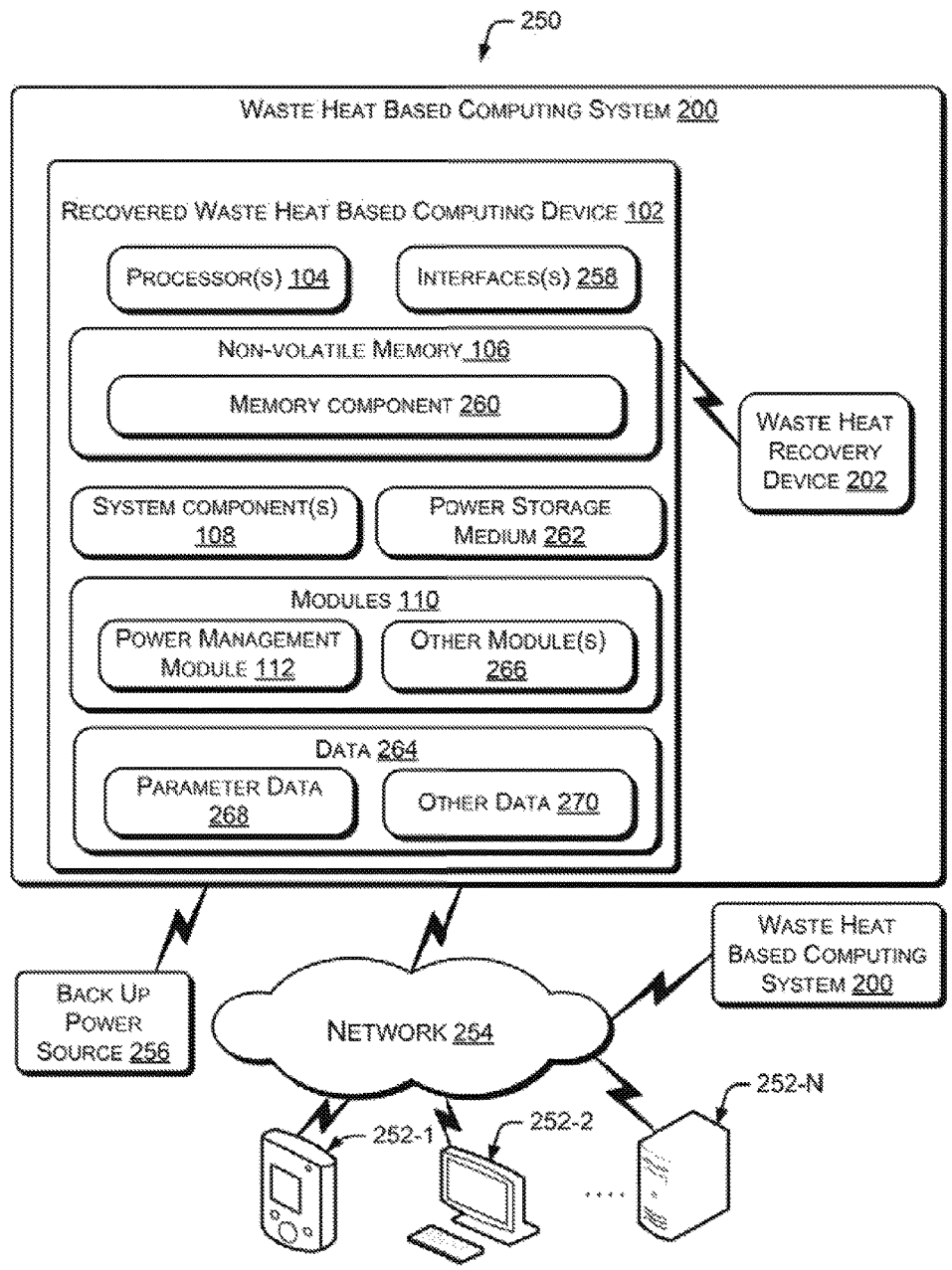

FIG. 2b illustrates a network environment 250 implementation of the waste heat based computing system 200 of FIG. 2a.

The network environment 250 comprises waste heat based computing systems 200. The waste heat based computing system 200 includes the recovered waste heat based computing device 102 coupled to the waste heat recovery device 202. The network environment 250 also includes a plurality of client devices 252-1, 252-2, . . . , 252-N, individually and commonly referred to as client device(s) 252 hereinafter, connected to the waste heat based computing system 200 through a network 254.

The client devices 252 may include computing devices, such as a laptop computer, a desktop computer, a notebook, a workstation, a measurement device built with a non-volatile memory for analyzing data and processing the data for performing an action, a mainframe computer, a mobile phone, and a personal digital assistant. In one example, the client devices 252 are used by clients to exchange information with the waste heat based computing system 200 over the network 254. In one implementation, the waste heat based computing system 200 may communicate with the client devices 252 when the waste heat based computing system 200 is powered on.

In one implementation, the network 254 may include a Global System for Mobile Communication (GSM) network, a Universal Mobile Telecommunications System (UMTS) network, or any ether communication network that use any of the commonly used protocols, for example. Hypertext Transfer Protocol (HTTP) and Transmission Control Protocol/Internet Protocol (TCP/IP).

Further, the network environment 250 comprises a backup power source 256 connected to the waste heat based computing system 200. In one example, the backup power source 256 may be a site electric grid, a battery, etc. As mentioned before, in an example, the recovered waste heat based computing device 102 is powered entirely on the recovered waste heat power. In another example, the recovered waste heat based computing device 102 is powered partially on the recovered waste heat power. In cases when the waste heat is not available, the recovered waste heat based computing device 102 may be powered through the backup power source 256.

In an example, as described previously, the recovered waste heat based computing device 102 includes the processor 104, the non-volatile memory 106 coupled to the processor 104, and the system components) 108 coupled to the processor 104. The non volatility memory 106 preserves the operational states of the system components 108 even when the recovered waste heat based computing device 102 is not powered ON.

The recovered waste heat based computing device 102 also includes interface(s) 258. The interfaces 258 may include a variety of commercially available interfaces, for example, interfaces for peripheral device(s), such as data input output devices, referred to as I/O devices, storage devices, network device. The I/O device(s) may include Universal Serial Bus (USB) ports, Ethernet ports, host bus adaptors, and their corresponding device drivers. The interface(s) 258 may facilitate the communication of the recovered waste heat based computing device 102 with various communication and computing devices and various communication networks, such as networks that use a variety of protocols, for example, Hypertext Transfer Protocol (HTTP) and Transmission Control Protocol/Internet Protocol (TCP/IP). The non-volatile memory 106 may further include memory components) 260 for preserving operational states of the system components 108.

The recovered waste heat based computing device 102 may further include power storage medium 262. In an example, the power storage medium 262 may be a battery. Further, the recovered waste heat based computing device 102 includes modules 110 and data 264. The modules 110 may include the power management module 112 and other module(s) 266. The other module(s) 266 may include programs or coded instructions that supplement applications or functions performed by recovered waste heat based computing device 102.

The data 264 may include parameter data 268 and other data 270. The parameter data 268 may store the usable and operable threshold values and information relating to the operation parameters corresponding to the system components 108, the processor 104, and the non-volatile memory 106. The other data 270 may include data generated and saved by the modules 110 for providing various functionalities of the recovered waste heal based computing device 102.

In operation, the power management module 112 receives recovered waste heat power from the waste heat recovery device 202. Upon receiving the power, the power management module 112 may determine whether the power is above the pre-determined usable threshold. In case the power is below the usable threshold, the power management module 112 may store the power into the power storage medium 262 until the power is above the usable threshold. In an example, the waste heat recovery device 202 may directly provide the power to the power storage medium 262 for storage. In cases when the waste heat is unavailable, the power storage medium 262 may provide the stored power to the power management module 112 for its operation. In such cases, the power storage medium 262 provides power to the power management module 112 for a limited period.

Thereafter, the power management module 112 initializes the system components 108, the processor 104, and the nonvolatile memory 106 to supply the power to the system components 108, the processor 104, and the non-volatile memory 108 based on the corresponding operation parameters. As mentioned previously, the operation parameters include the performance targets and the power ratings. Subsequently, the power management module 112 determines the current power level of the waste heat which the waste heat recovery device 202 may be receiving from a waste heat source.

Further, the power management module 112 determines whether the current power level is below the operable threshold. Based on the determination, the power management module 112 determines the backup power level. In an example, the power management module 112 may determine the backup power level based on the power available in the power storage medium 262. In another example, the power management module 112 may determine the backup power level based on the power available in the backup power source 256.

Once the current power level and the backup power level are determined, the power management module 112 initiates the power retrench mode through enabling one of the hibernate mode, the hybrid sleep mode, and the switch OFF node. The power retrench mode may relate to preserving operational states of the system components 108 in the non-volatile memory 106. In an example, the power management module 112 preserves the operational states of the system components 108 in the memory components 260 of the non-volatile memory 106. The operational sates of the system components 108 may also be preserved in the power storage medium 262 in case of the waste heat outage.

Further, the power management module 112 initiates the power retrench mode in an event of waste heat outage. According to an example, the power management module 112 may simultaneously communicate this event of waste heat outage to the client devices 252. Alternatively, when the waste heat based computing system 200 is not powered, the client device 252 can infer the state of waste heat based computing system 200 based on inactivity of the waste heat based computing system 200.

In an example, the power management module 112 may restore the preserved operational states of the system components 108 based on initializing the system component 108 for operation. The power management module 112 may restore the operational states once power is available. In an example, the power management module 112 may initialize the system components 108 based on bringing the recovered waste heat based computing device 102 into a working state. In case the waste heat is not available for power generation, the recovered waste heat based computing device 102 may receive power from the backup power source 256. As mentioned above, the backup power source 256 may be the electric grid, the battery, and the like.

Figure 3:
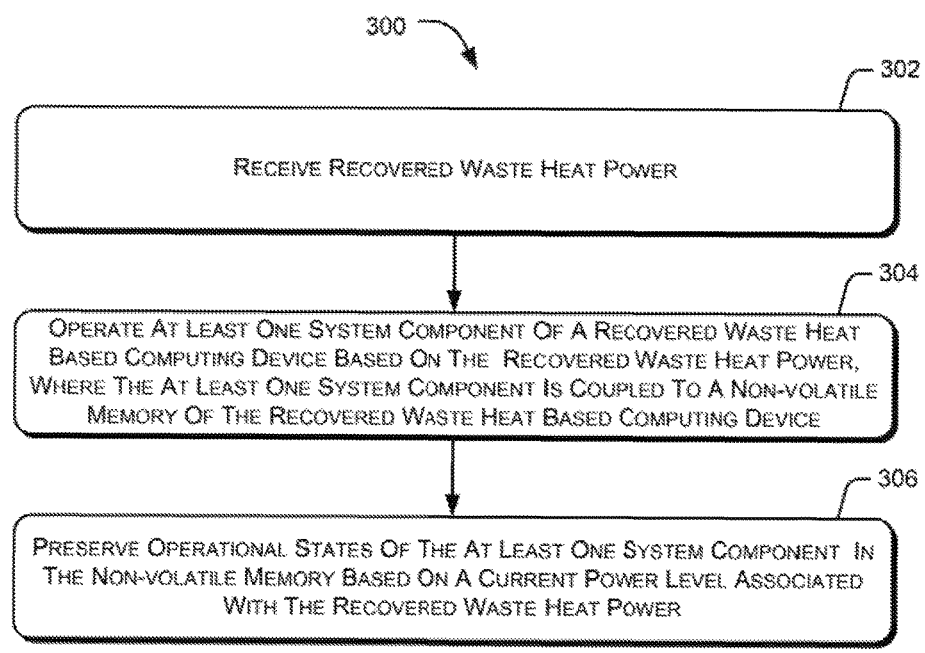
FIG. 3 is a flowchart for operating the recovered waste heat based computing device of FIG. 1 based on recovered waste heat power.

FIG. 3 is a flowchart for operating the recovered waste heat based computing device 102 of FIG. 1 based on recovered waste heat power.

The order in which method 300 is described is not intended to be construed as a limitation, and some of the described method blocks can be combined in a different order to implement the method 300, or an alternative method. Additionally, individual blocks may be deleted from the method 300 without departing from the spirit and scope of the subject matter described herein. Furthermore, the method 300 may be implemented in any suitable hardware, computer-readable instructions, or combination thereof.

The steps of the method 300 may be performed by either a computing device under the instruction of machine executable instructions stored on a computer readable medium or by dedicated hardware circuits, microcontrollers, or logic circuits. Herein, some examples are also intended to cover computer readable medium, for example, digital data storage media, which are machine or computer readable and encode machine-executable or computer-executable instructions, where said instructions perform some or all of the steps of the described method 300.

With reference to method 300 as depicted in FIG. 3, at block 302, the method 300 includes receiving recovered waste heat power. The recovered waste heat power may be received from a waste heat recovery device. The waste heat recovery device recovers waste heat from a waste heat source and generates power from the recovered waste heat. In an example, the power management module 112 of the recovered waste heat based computing device 102 receives the recovered waste heat power.

As shown at block 304, the method 300 includes operating at least one system component of the recovered waste heat based computing device based on the recovered waste heat power, where the at least one system component is coupled to a non-volatile memory of the recovered waste heat based computing device. The operating may be based on supplying the recovered waste heat power to the system component based on an operation parameter corresponding to the system component. In an example, the power management module 112 operates the at least one system component 108 based on the recovered waste heat power.

As illustrated in block 306, the method 300 includes preserving operational states of the at least one system component in the non-volatile memory based on a current power level associated with the recovered waste heat power. In an example, the operational states of the at least one system component may be preserved through initiating a power retrench mode by enabling one of the hibernate mode, the hybrid sleep mode, and the switch OFF mode. In an example, the power management module 112 preserves the operational states of the system component 108 in the non-volatile memory 106.

Figure 4:
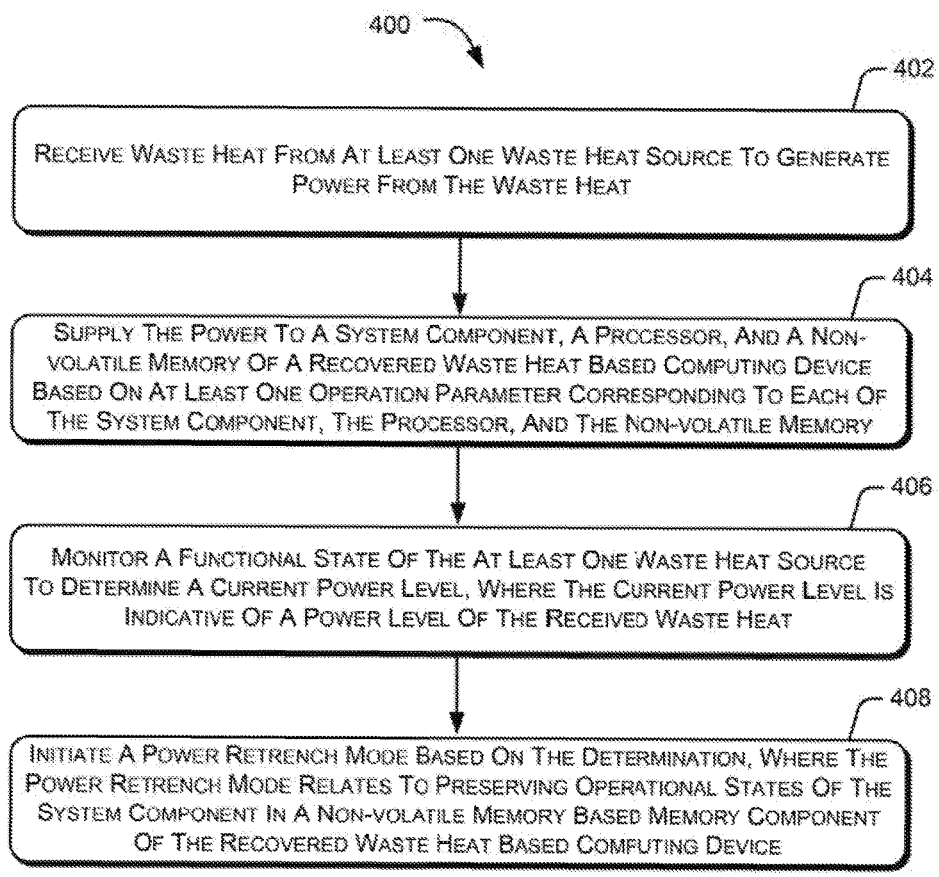
FIG. 4 is a flowchart for operating the recovered waste heat based computing device of FIG. 1 based on recovered waste heat.

FIG. 4 illustrates a flowchart for operating the recovered waste heat based computing device 102 of FIG. 1 based on recovered waste heat.

The order in which method 400 is described s not intended to be construed as a limitation, and some of the described method blocks can be combined in a different order to implement the method 430, or an alternative method. Additionally, individual blocks may be deleted from the method 400 without departing from the spirit and scope of the subject matter described herein. Furthermore, the method 400 may be implemented in any suitable hardware, computer-readable instructions, or combination thereof.

The steps of the method 400 may be performed by either a computing device under the instruction of machine executable instructions stored on a computer readable medium or by dedicated hardware circuits, microcontrollers, or logic circuits. Herein, some examples are also intended to cover a computer readable medium, for example, digital data storage media, which are machine or computer readable and encode machine-executable or computer-executable instructions, where said instructions perform some or all of the steps of the described method 400.

With reference to method 400 as depicted in FIG. 4, at block 402, the method 400 includes receiving waste heat from at least one waste heat source to generate power from the waste heat. In an example, the waste heat recovery device 202 receives the waste heat from at least one waste heat source 206 and generates power from the waste heat.

As shown at block 404, the method 400 includes supplying the power to a system component, a processor, and a non-volatile memory of the recovered waste heat based computing device based on al least one operation parameter corresponding to each of the system component the processor, and the non-volatile memory. The operating parameters include one of the performance target and the power rating. In an example, the power management module 112 may receive the power from the waste heat recovery device 202 and then supply the power to the system component 108, the processor 104, and the non-volatile memory 106.

As illustrated in block 406, the method 400 includes monitoring a functional state of the at least one waste heat source to determine a current power level. The functional state of a waste heat source may be one of "Fully functional", "Partially functional", and "Non functional". In an example, the power management module 112 monitors the at least one waste heat source 206 to determine whether the current power level which the power management module 112 may be supplying to the system component 108 is below the operable threshold.

At block 408, the method 400 includes initiating a power retrench mode based on the determination, where the power retrench mode relates to preserving operational states of the system component in a non-volatile memory based memory component. In an example, the power management module 112 preserves the operational states of the system component 108 in the memory component 260 of the non-volatile memory 106.

Figure 5A:
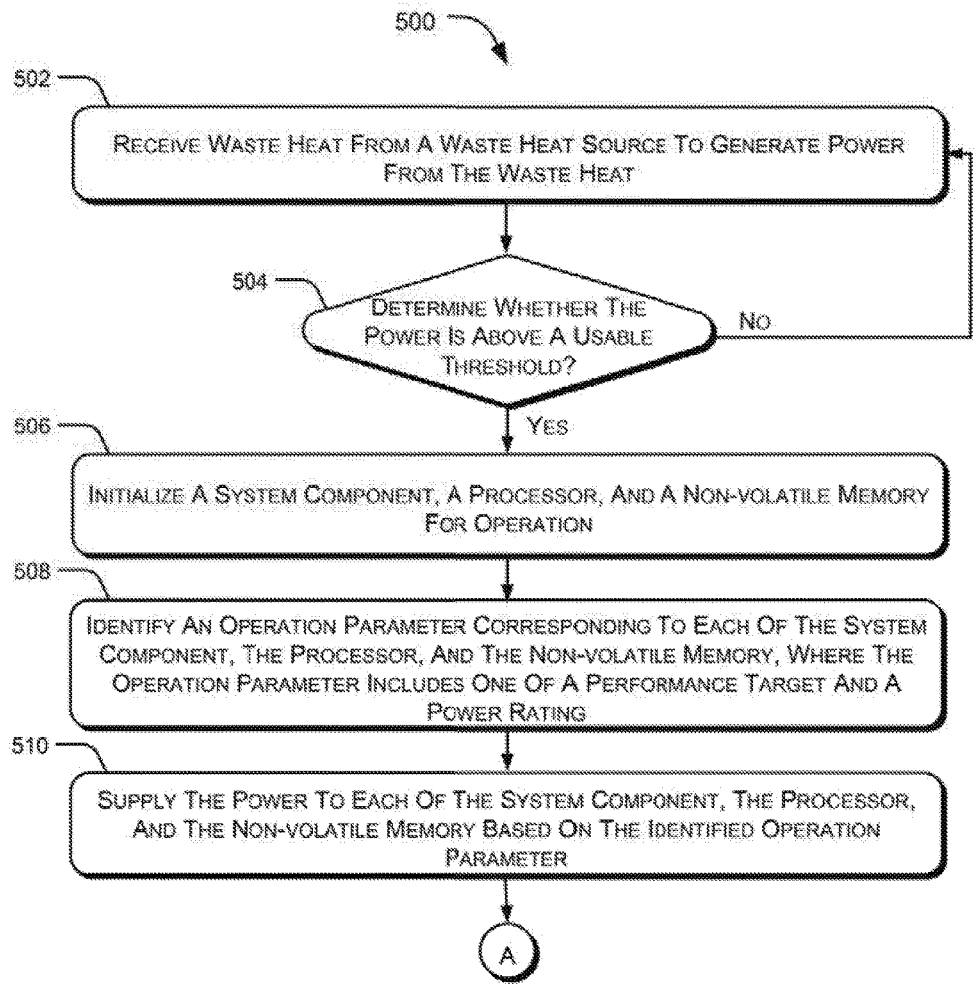
FIGS. 5a and 5b are flowcharts for operating the recovered waste heat based computing device of FIG. 1 based on the recovered waste heat.
Figure 5B:
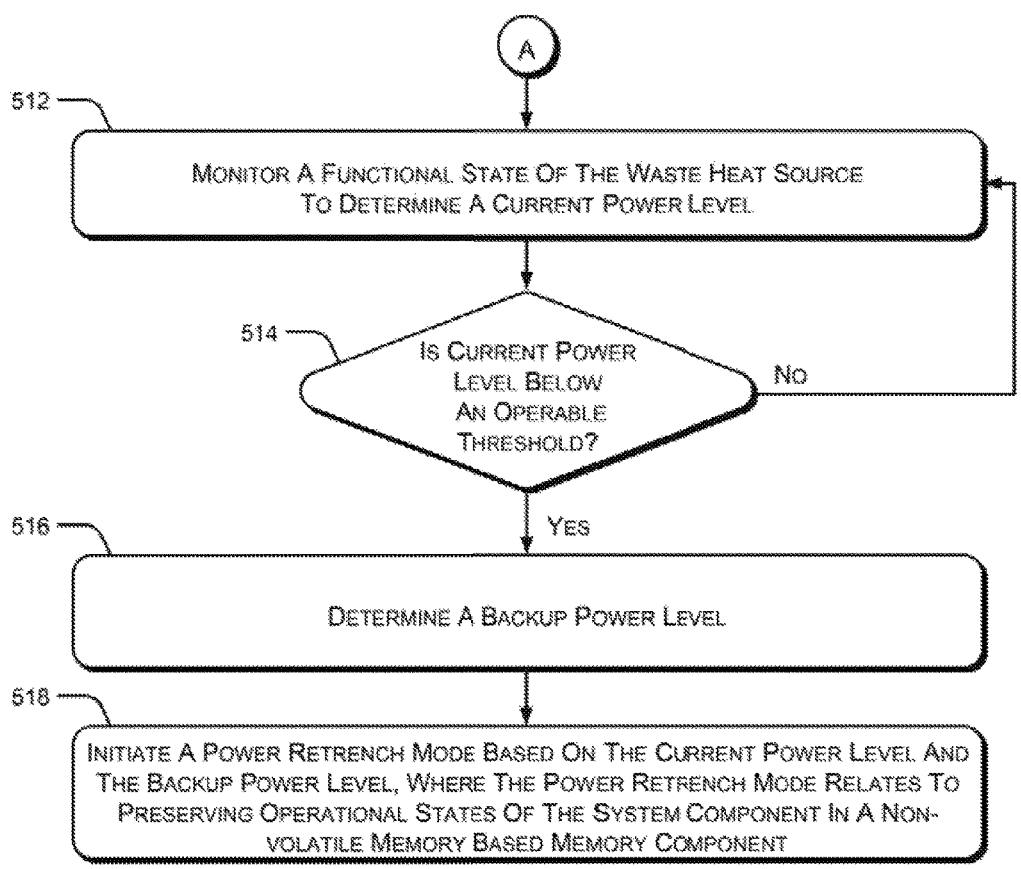

FIGS. 5a and 5b are flowcharts for operating a recovered waste heat based computing device 102 of FIG. 1 based on recovered waste heat.

The order in which method 500 is described s not intended to be construed as a limitation, and some of the described method blocks can be combined in a different order to implement the method 500, or an alternative method. Additionally, individual blocks may be deleted from the method 500 without departing from the spirit and scope of the subject matter described herein. Furthermore, the method 500 may be implemented in any suitable hardware, computer-readable instructions, or combination thereof.

The steps of the method 500 may be performed by either a computing device under the instruction of machine executable instructions stored on a computer readable medium or by dedicated hardware circuits, microcontrollers, or logic circuits. Herein, some examples are also intended to cover computer readable medium, for example, digital data storage media, which are machine or computer readable and encode machine-executable or computer-executable instructions, where said instructions perform some or all of the steps of the described method 500.

With reference to method 500 as depicted in FIG. 5a, at block 502, the method 500 includes receiving waste heat from a waste heat source to generate power from the waste heat. In an example, the waste heat recovery device 202 receives the waste heat from the waste heat source 206 to generate the power from the waste heat.

As shown at block 504, the method 500 includes determining whether the power is above a usable threshold. The usable threshold may be a minimum power threshold on which the recovered waste heat based computing device operates. In one example, the power management module 112 may receive the power from the waste heat recovery device 202 and then determine whether the power is above a usable threshold. If it is determined that the power is above the usable threshold, the method 500 proceeds to block 506 ('Yes' branch).

As depicted in block 506, the method 500 includes initializing a system component, a processor, and a non-volatile memory for operation. In an example, the power management module 112 may initialize the system component 108, the processor 104, and the non-volatile memory 106 for their operation.

However, if at block 504, if it is determined that the received power is below the usable threshold, the method 500 proceeds back to block 502 ('No' branch). In an example, in case the power received by the power management module 112 is below the usable threshold, the power management module 112 stores the power into the power storage medium 262 until the power is above the usable threshold.

As illustrated in block 508, the method 500 includes identifying an operation parameter corresponding to each of the system component, the processor, and the non-volatile memory, where the operation parameter includes one of a performance target and a power rating. In an example, the power management module 112 may identify at least one operation parameter corresponding to each of the system component 108, the processor 104, and the non-volatile memory 106.

At block 510, the method 500 includes supplying the power to each of the system component, the processor, and the non volatile memory based on the identified operation parameter. In an example, the power management module 112 may supply the power to the system component 108, the processor 104, and the non-volatile memory 106 based on at least one operation parameter corresponding to each of the system component 108, the processor 104, and the nom volatile memory 106.

As shown in block 512, the method 500 includes monitoring a functional state of the waste heat source to determine a current power level. In one example, the power management module 112 may monitor the functional state of the waste heat source 206 to determine the current power level.

As depicted in block 514, the method 500 includes determining whether the current power level is below an operable threshold. The operate threshold may be understood as a minimum power at which the system component 108 operates. According to an example, the power management module 112 may determine whether the current power level is below the operable threshold. If it is determined that the current power level is below the operable threshold, the method 500 proceeds to block 516 ("Yes" branch).

As depicted in block 516, the method 500 includes determining a backup power level. In an example, the power management module 112 may determine the backup power level based on power stored or available in the power storage medium 262 or in the backup power source 256.

However, if at block 514, it is determined that the current power level is above the operable threshold, the method 500 proceeds back to block 512. In an example, if it is determined that the current power level is above the operable threshold, the power management module 112 continues to monitor the waste heat source and takes no action.

As illustrated in block 518, the method 500 includes initiating a power retrench mode based on the current power level and the backup power level, where the power retrench mode relates to preserving operational states of the system component in a non-volatile memory based memory component. In one example, the power management module 112 preserves the operational states of the system component 108 in the non-volatile memory 106 based memory component 160.

Although implementations for operating a computing device based on recovered waste heat have been described in language specific to structural features and/or methods, it is to be understood that the appended claims are not necessarily limited to the specific features or methods described. Rather, the specific features and methods are disclosed as examples of systems and methods for operating based on recovered waste heat.

We claim:

1. A computing device, comprising:
   a processor;
   a non-volatile memory coupled to the processor;
   at least one system component coupled to the processor; and
   a power management module coupled to the processor to:
     supply power, received from a waste heat source, to the processor, the non-volatile memory, and the at least one system component;
     monitor the waste heat source to determine a current power level of the waste heat source; and
     based on determining that the current power level of the waste heat source is below a threshold, initiate a power retrench mode that preserves operational states of the at least one system component in the non-volatile memory.

2. The computing device of claim 1, wherein the power management module is to supply the power to the processor, the non-volatile memory, and the at least one system component based on a respective operation parameter of each of the processor, the non-volatile memory, and the at least one system component.

3. The computing device of claim 2, wherein the operation parameter comprises one of a power rating and a performance target.

4. The computing device of claim 1, wherein the threshold indicates a minimum power at which the at least one system component operates.

5. The computing device of claim 1, wherein the power management module is to preserve the operational states of the at least one system component by enabling one of a hibernate mode, a hybrid sleep mode, and a switch OFF mode.

6. The computing device of claim 1, wherein the power management module is to preserve the operational states of the at least one system component based on throttling an operation of at least one of the processor and the system component.

7. The computing device of claim 1, wherein the power management module comprises machine-readable instructions executable on the processor.

8. The computing device of claim 1, wherein the power management module is to receive a temperature measurement from a sensor that monitors a temperature of the waste heat source, and
   wherein the determining of the current power level of the waste heat source is based on the temperature measurement.

9. The computing device of claim 8, wherein the determining of the current power level of the waste heat source is based on a rate of change of temperature of the waste heat source.

10. The computing device of claim 1, wherein the power management module is to determine whether waste heat from the waste heat source is continuously produced, cyclically produced, or intermittently produced, and
    wherein the determining of the current power level is based on the determining of whether waste heat from the waste heat source is continuously produced, cyclically produced, or intermittently produced.

11. A method for operating a recovered waste heat based computing device based on recovered waste heat power, the method comprising:
    receiving recovered waste heat power;
    operating at least one system component of the recovered waste heat based computing device based on the recovered waste heat power, wherein the at least one system component is coupled to a non-volatile memory of the recovered waste heat based computing device; and preserving operational states of the at least one system component in the non-volatile memory based on a current power level associated with the recovered waste heat power.

12. The method of claim 11, wherein the recovered waste heat power is received from a waste heat recovery device.

13. The method of claim 11, wherein the preserving comprises initiating a power retrench mode by enabling one of a hibernate mode, a hybrid sleep mode, and a switch OFF mode.

14. The method of claim 11, further comprising restoring the preserved operational states of the at least one system component from the non-volatile memory based on initializing the at least one system component for operation.

15. The method of claim 11, wherein the preserving of the operational states of the at least one system component in the non-volatile is in response to determining that the current power level of the recovered waste heat power is less than a threshold.

16. A non-transitory storage medium comprising instructions that upon execution cause a system to:
cause supplying of power generated from waste heat from a waste heat source to a system component, a processor, and a non-volatile memory of a computing device based on at least one operation parameter corresponding to each of the system component, the processor, and the non-volatile memory;
monitor a functional state of the waste heat source to determine a current power level of the power generated from the waste heat; and
initiate a power retrench mode based on the determining that the current power level of the power generated from the waste heat is below a threshold, where the power retrench mode preserves operational states of the system component in the non-volatile memory.

17. The non-transitory storage medium of claim 16, wherein the instructions upon execution cause the system to:
determine whether the power generated from the waste heat is above the threshold; and
initialize the system component, the processor, and the non-volatile memory for operation based on determining that the current power level of the power generated from the waste heat is above the threshold.

18. The non-transitory storage medium of claim 16, wherein the instructions upon execution cause the system to:
in response to determining that the current power level of the power generated from the waste heat is below the threshold, determine a backup power level,
wherein the initiating of the power retrench mode is further based on the backup power level.

19. The non-transitory storage medium of claim 16, wherein the instructions upon execution cause the system to:
receive a temperature measurement from a sensor that monitors a temperature of the waste heat source, and
wherein the determining of the current power level of the power generated from the waste heat is based on the temperature measurement.

20. The non-transitory storage medium of claim 19, wherein the determining of the current power level of the power generated from the waste heat is based on a rate of change of temperature of the waste heat.

* * * * *